Nov. 13, 1956   W. F. FIEBER   2,770,493
SPRAY BOOM
Filed June 26, 1952   3 Sheets-Sheet 1
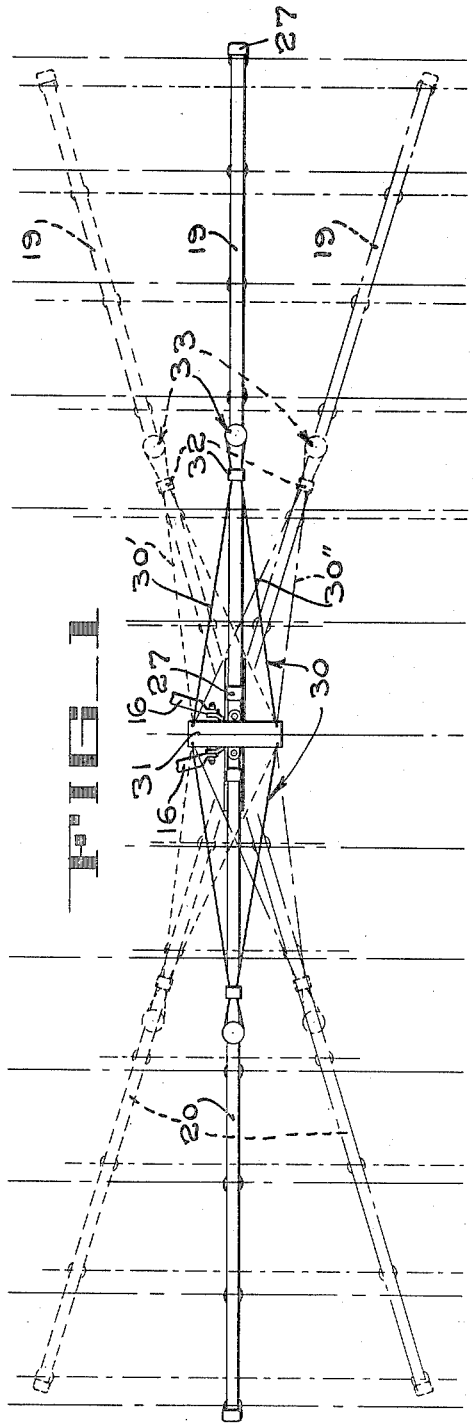
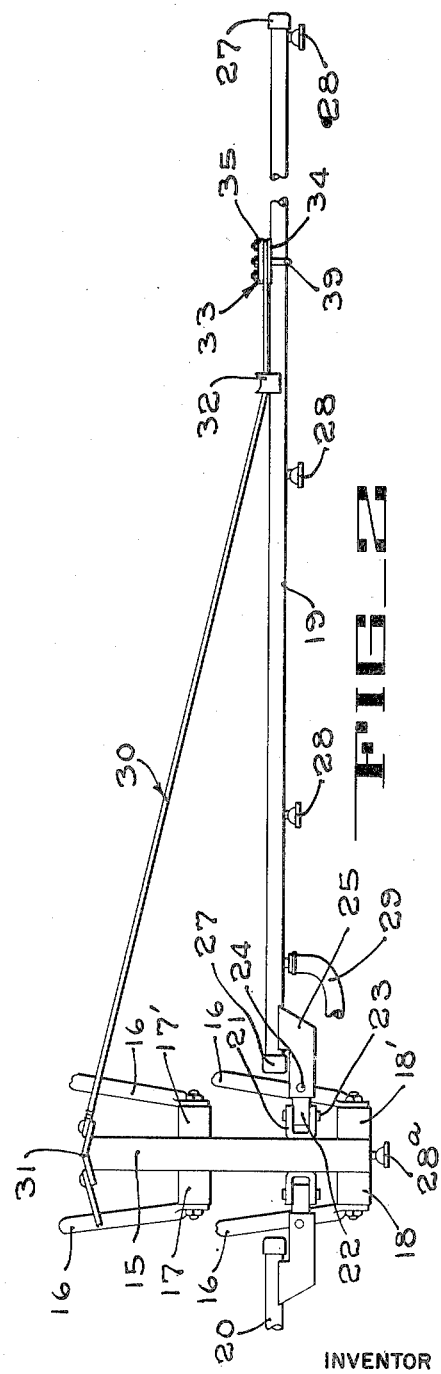
INVENTOR
WALTER F. FIEBER
BY Hans G. Hoffmeister
ATTORNEY

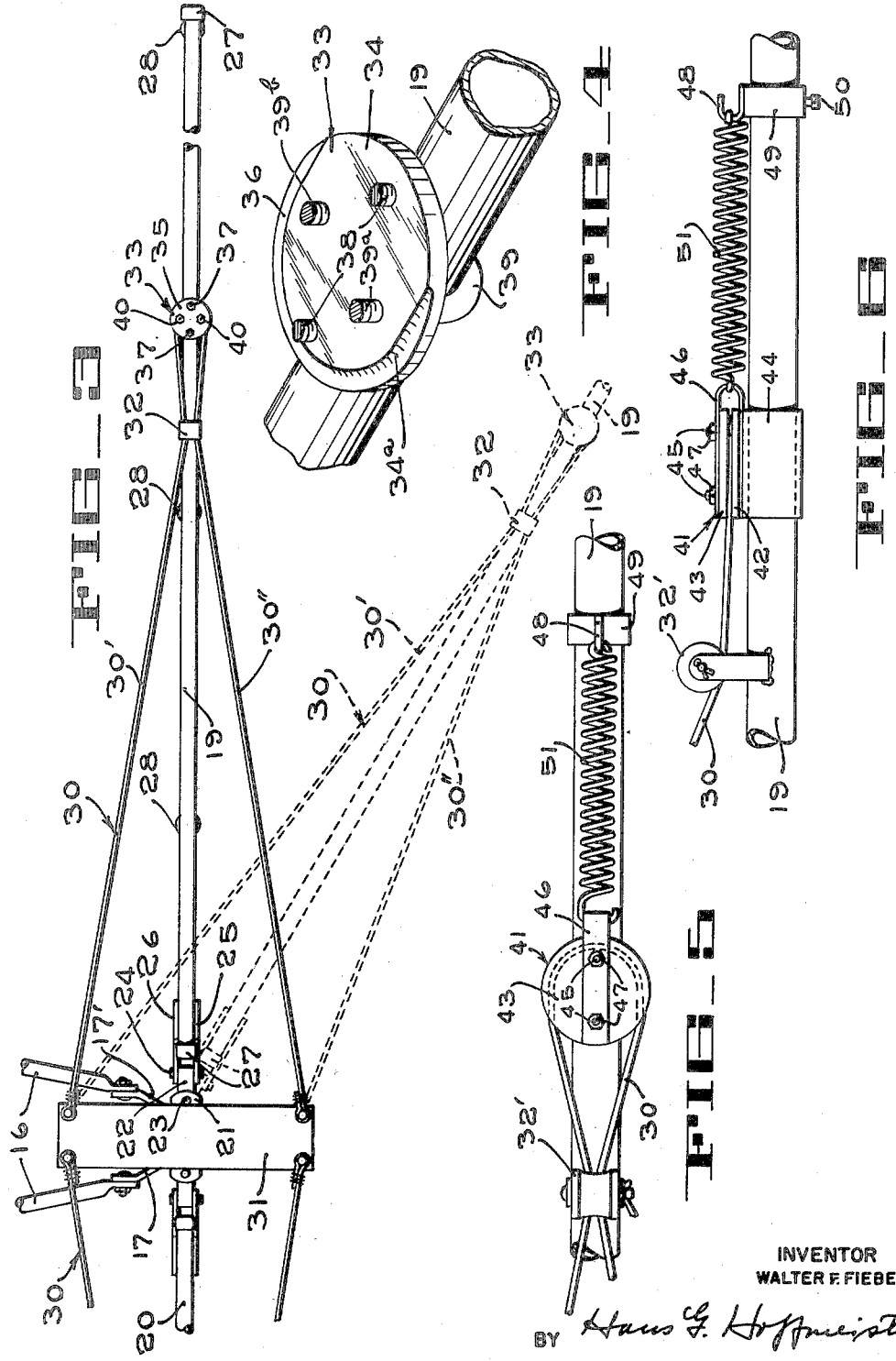

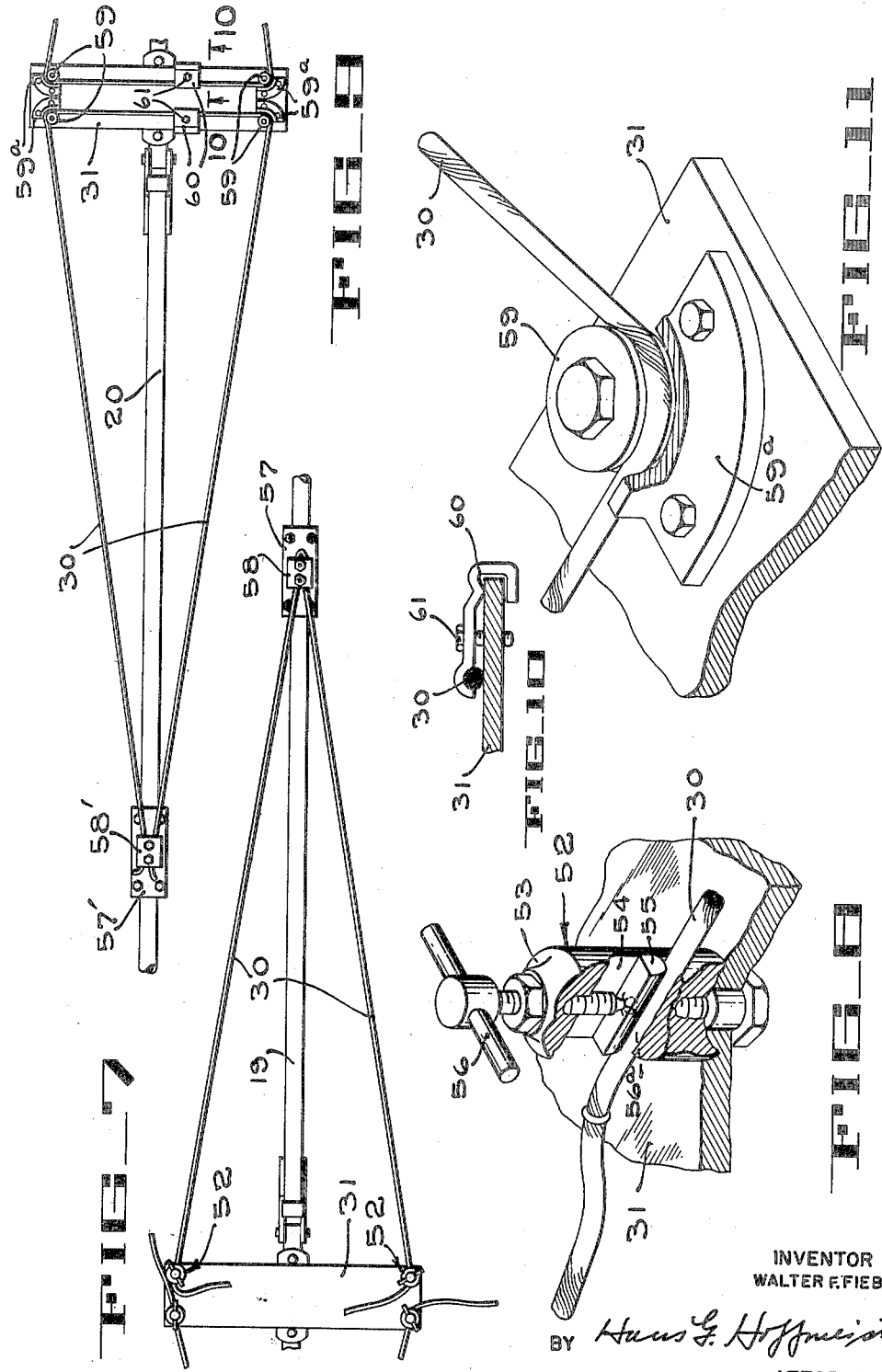

United States Patent Office 2,770,493
Patented Nov. 13, 1956

2,770,493

SPRAY BOOM

Walter F. Fieber, Saukville, Wis., assignor to Food Machinery and Chemical Corporation, San Jose, Calif., a corporation of Delaware Application June 26, 1952, Serial No. 295,698

16 Claims. (Cl. 299—39)

The present invention relates to plant spraying machines and is more particularly concerned with an adjustably and yieldably mounted spray boom to be utilized with machines of this type.

It is an object of the present invention to provide a spray boom structure adapted to be manufactured and sold as a complete unit for installation and use on various types of vehicles employed in spraying crops.

Another object of the invention is to provide a spray boom structure which may be readily adjusted to compensate for differences in the row-spacing of plants and for angular variations in the terrain.

A further object is to provide a spray boom structure in which the boom is suspended in a manner preventing damage to the structure from shock when operating over rough terrain.

An additional object is provide a spray boom structure wherein the boom is suspended in a manner permitting it to yield to and clear obstacles, such as bushes, that it may encounter during practical performance.

It is another object to provide a spray boom structure which is of comparatively simple construction but which is highly effective and adaptable to most plant spraying operations.

These and other objects and advantages of the invention will be apparent from the following description and the accompanying drawings wherein:

Fig. 1 is a top plan view illustrating a spray boom structure embodying the present invention.

Fig. 2 is an enlarged side elevational view showing a portion of the spray boom structure illustrated in Figure 1.

Fig. 3 is an enlarged top plan view of the portion of the boom structure illustrated in Fig. 2 to more clearly show details of construction.

Fig. 4 is an enlarged fragmentary perspective view of a clamp utilized in the structure illustrated in Figs. 1, 2 and 3.

Fig. 5 is a fragmentary top plan view illustrating a modified form of the present invention.

Fig. 6 is a side elevational view of the structure shown in Fig. 5.

Fig. 7 is a top plan view illustrating another modified form of the present invention.

Fig. 8 is an enlarged perspective view of a portion of the structure shown in Figure 7, with parts broken away to expose the clamping means employed in said structure.

Fig. 9 is a top plan view illustrating yet another modified form of the present invention.

Fig. 10 is a sectional view taken on line 10—10 of Fig. 9.

Fig. 11 is an enlarged perspective view illustrating a pulley arrangement employed in the modified form of the invention shown in Fig. 9.

The exemplary embodiment of the invention illustrated in the drawings generally comprises a pair of elongated boom sections 19, 20 (Fig. 1) which are supported for universal pivotal movement from the opposite sides of a central support 15 and are retained in adjusted pivotal position by means of a cable suspension 30 which extends between each boom section 19, 20 and the described central support 15. This support 15 is, in turn, adapted for mounting upon most vehicles normally employed in plant spraying operations.

With particular reference to Figs. 1, 2 and 3, the central support 15 of the spray boom structure is formed by a vertically extending tube of rectangular cross section. Links 16 are pivotally connected at one end to laterally extending ears 17, 17' and 18, 18' secured in pairs to each side of the central support 15 at vertically spaced points thereof, and at the other end to the plant spraying machine (not shown) to thus provide a pivotal mounting for the central support 15 which will permit vertical adjustment thereof to various heights. Means (not shown) are also provided to maintain the described support rigidly at any one desired level, dependent upon the type of crop which is to be sprayed.

The pair of boom sections 19, 20 extend outwardly in opposing endwise relation from the sides of the central support 15 at a level intermediate the pairs of supporting ears 17, 17' and 18, 18'. Since the sections on opposite sides are mirror images of one another, further detailed description will be limited to one section, with continued reference to Figs. 1, 2 and 3.

To mount the boom section 19 for universal pivotal movement, a U-shaped bracket 21 is suitably secured to the central support 15 and a vertical pin 23 on said bracket supports a link 22 for horizontal pivotal movement. The outer extremity of this pivoted link 22 has a transverse hole for rotary reception of a second pin 24 which extends horizontally between two arms 25, 26 dependent from the sides of the boom section 19. Therefore, the boom section 19 may be pivoted about both horizontal and vertical axes, the pin 23 defining the vertical axis and the pin 24, the horizontal.

The pivotally mounted boom section 19 comprises a length of tubing closed at its ends by caps 27 and formed with apertures at regularly spaced intervals along its underside for the reception of spray nozzles 28 which extend downwardly therefrom. It will be understood that drop tubes of conventional construction may be mounted in the spray nozzle apertures to change the vertical position of the nozzles, if desired. A flexible hose 29 connects the boom section to a suitable source of spray fluid under pressure (not shown). A central spray nozzle 28a mounted at the lower end of the tubular central support 15 may likewise be connected to the source of spray fluid.

The boom section 19 is supported in any desired angular position relative to the central support 15 by a suspension cable 30 which is arranged to form a V with its ends affixed to the extremities of an elongated plate or crosshead 31 rigidly mounted on the top of the central support 15. The cable halves or guys 30' and 30" converge downwardly toward an intermediate point on the boom section so that the midpoint of the cable 30 which constitutes the apex of the V may be secured to a clamp 33 affixed to the boom section 19 in a manner to be described more fully hereinafter.

This V-shaped suspension holds the boom section firmly against pivotal movement in a horizontal plane, as well as supporting it against the downward pull of gravity. However, it will be apparent that the boom section 19 may pivot vertically or angularly upward when an exterior force is applied. Accordingly, if the boom section engages a rigid object during a spraying operation, it merely pivots upwardly to pass said object and then returns undamaged to its previously occupied position.

The clamp 33 on the boom section comprises a pair of superposed circular plates 34, 35 (Figs. 3 and 4), the inner edges of which are beveled, as shown at 34a, to form a peripheral groove 36 therebetween within which the midportion of the cable 30 is received and wherein it may be clamped tightly into a predetermined position. To effect such clamping action, the plates 34 and 35 are pressed together by the application of nuts 37 to a pair of diametrically opposed studs 38 which extend upwardly from the lower or base plate 34 and pass through bores formed in the upper or cover plate 35. To secure the plates 34, 35 to the boom section 19, the threaded shanks 39a and 39b of a U-bolt 39 which embraces said boom section, extend upwardly through aligned bores in the plates for the reception of a second pair of nuts 40.

As will be readily apparent, when the second pair of nuts 40 on the U-bolt 39 are loosened, the clamp 33 may be moved axially along the boom section 19 to provide for pivotal adjustment of the same about a horizontal axis. If both pairs of nuts 37 and 40 are loosened, to release the pressed engagement of the plates 34, 35, the boom section may be adjusted laterally about a vertical axis, by sliding the supporting cable 30 in the groove 36 formed by the plates 34, 35.

To facilitate such sliding movement of the cable 30, and to prevent accidental disengagement thereof from its mooring within the groove 36, means are provided to assure that the cable 30 approaches the clamp 33 in a plane as substantially defined by the peripheral groove 36. Such means comprises a guide which is secured to the boom section 19 at a point spaced from the clamp 33 in the direction of the central support 15. As shown in Figs. 1, 2 and 3, the guide may be a retainer strap 32 through which the cable halves 30' and 30" pass as they approach the clamp. Alternatively, the guide may take the form of a pulley 32', as shown in Figs. 5 and 6. With such an arrangement, the cable halves 30' and 30" approach the clamp 33 at the proper angle irrespective of the position of the boom section whereby easy adjustment of the cable position relative to the clamp 33 is provided and accidental detachment therefrom is effectively avoided.

Pivotal adjustment of the boom about a horizontal axis, as herein described, is primarily for the purpose of producing a variation in the spray-angle, whereas, lateral adjustment of the boom about a vertical axis, as indicated in dotted outline in Fig. 1, adapts the spraying machine for use with different row-spacing of plants.

These adjustments give a wide adaptability to this simple and inexpensive spray boom structure and may be carried out in an extremely simple manner so that variances in operational requirements may be readily met. Thus, the operator can, at will, merely by loosening nuts 37 and 40 on the clamp 33 pivotally adjust the boom section 19 either laterally or vertically, or both, relative to the central support 15. Any desired adjustment of the boom is accomplished by operation at this one point.

Occasionally, a spraying operation will be carried on over excessively rugged terrain. Since the spray boom hereinabove described is supported by a cable whose degree of stretch is rather low, an alternate support arrangement has been devised to provide for the absorption of shocks sustained when operating on such rough terrain. To this end, a resilient element may be incorporated as part of the boom suspension means. As shown in Figs. 5 and 6, this modified form of the present invention may incorporate a clamp 41 comprising a circular base plate 42 and a circular cover plate 43, comparable to those of the previously described clamp 33, and a collar or yoke 44 adapted to slidably embrace the boom section. Studs 45, provided on the yoke portion 44, project upwardly through aligned apertures formed in the base and cover plates 42 and 43 and in a U-shaped strap 46 which encompasses these plates, so that nuts 47 may clamp all these elements rigidly together. Between the closed end of this U-strap 46, which extends parallel to the axis of the tubular boom section, and a hook 48 secured to a circular clamp 49 affixed to the boom by a set screw 50, a spring 51 is restrained under tension. Accordingly, since the cable clamp 41 can slide axially on the boom section, jars and shocks imparted to the boom and its supporting structure during operation will be absorbed by the spring 51, thus relieving strain on the cable and on the spray boom.

Another modified form of the invention is shown in Figs. 7 and 8 wherein the ends of the cable 30 are secured to the extremities of the crosshead 31 by a pair of screw clamps 52. Each of said clamps comprises a short cylinder 53 secured to the crosshead in a vertical position and has a diametrical slot 54, through which the cable passes. Within said slot, the cable is engaged by a bar 55 that is rotatably mounted at the extremity of a thumb screw 56 as shown at 56a, and said thumb screw in turn is threadly received in an axial bore of the cylinder 53. At a point intermediate its ends, the cable is secured between a rectangular base plate 57 releasably secured to the boom section 19 and a cover plate 58 bolted to said base plate. The position of the boom section may be adjusted by loosening either the cover and base plates 57, 58 or by turning the thumb screws 56 to release the clamps 52 on the crosshead. It will be apparent that the latter means is more facile since the operator need employ no wrench or other tool.

Referring now to Figures 9, 10 and 11, a further modification of the invention utilizes a pair of plates 57', 58' identical to the plates 57, 58 shown in Fig. 7. However, in the embodiment shown in Figs. 9, 10 and 11, the ends of the cable 30, rather than the mid-portion thereof, are secured between plates 57', 58' on the boom section 20. On each end of the crosshead 31 is journaled a pulley 59 about which the intermediate portion of the cable may be trained and guides 59a may be provided adjacent to the outer sectors of said pulleys to retain the cable in engagement therewith. A clamp 60 is hooked over the edge of the crosshead 31 intermediate its end and is adapted to engage the cable. When a cap screw 61 is tightened, the clamp 60 holds the cable tightly against the upper surface of said crosshead 31, as shown in Figure 10. With this modified structure, the lateral adjustment of the boom is facilitated since it is only necessary to loosen the clamp 60 to permit movement of the cable around the pulleys 59 whereby pivotal movement of the boom about a vertical axis is enabled.

The spray boom structure herein described is particularly adapted for utilization with a plant spraying machine of the type disclosed in the application of Joseph B. Kucera, Serial No. 158,578, now Patent 2,657,093, but it will be readily understood that the present device may easily be applied to other machines of a similar nature, since the unitary nature of the device permits all pivotal adjustments of the spray boom sections 19, 20 relative to their central support 15 to be made on the boom structure itself.

The simplicity, and yet the universality, of the mechanism are maintained in all forms of the invention herein described, and it will be understood that various other changes and modifications may be made in the details thereof without departing from the spirit and scope of the appended claims.

Having thus described the invention what I claim as new and desire to protect by Letters Patent is as follows:

1. In a spraying unit, a central support including an upright member, and a crosshead secured intermediate its ends to said upright member, a boom having one end thereof disposed below the crosshead adjacent the upright member and pivotally connected to the latter, a continuous flexible boom supporting element including a pair of tension sections connected to and diverging upwardly from an intermediate portion of the boom and engaged to opposite ends of said crosshead, and clamp means engaging the flexible element intermediate its ends to adjust the position of the boom relative to the central support.

2. In a spraying unit, a central support including an upright member, and a crosshead secured intermediate its ends to said upright member, a boom having one end thereof disposed below the crosshead adjacent the upright member and pivotally connected to the latter, a continuous flexible boom supporting element including a pair of tension sections engaged to opposite ends of the crosshead and converging downwardly and outwardly therefrom, and a clamp mounted on the boom to releasably engage said flexible element intermediate its ends and providing means whereby the boom is adjustably supported relative to said central support.

3. In a spraying unit, a central support including an upright member, and a crosshead secured intermediate its ends to said upright member, a boom having one end thereof disposed below the crosshead adjacent the upright member and pivotally connected to the latter, a continuous flexible boom supporting element including a pair of tension sections engaged to opposite ends of the crosshead and converging downwardly and outwardly therefrom, a clamp adjustably mounted on the boom, and means on said clamp to releasably engage said flexible element intermediate its ends.

4. In a spraying unit, a central support including an upright member, and a crosshead secured intermediate its ends to said upright member, a boom having one end thereof disposed below the crosshead adjacent the upright member and pivotally connected to the latter, guide pulleys journaled on said crosshead and disposed on opposite sides of the longitudinal axis of said upright member, a flexible element trained about said guide pulleys and converging downwardly and outwardly therefrom, a clamp adjustably mounted on the boom to engage the flexible element whereby the position of the boom may be varied about a horizontal axis, and another clamp secured on said crosshead to releasably engage said flexible element whereby said boom may be adjusted about a vertical axis.

5. In a spraying unit, a central support including an upright member, and a crosshead secured to said upright member, a boom pivotally supported from said upright member, a guide secured at a remote point on said boom, a flexible element including a pair of tension sections engaged to opposite ends of the crosshead and converging downwardly and outwardly therefrom to pass through said guide, and a clamp adjustably positioned on said boom to engage said flexible element.

6. In a spraying unit, a central support including an upright member, and a crosshead secured intermediate its ends to said upright member, a boom having one end thereof disposed below the crosshead adjacent the upright member and pivotally connected to the latter, a guide secured at a remote point on said boom, a flexible element including a pair of tension sections engaged to opposite ends of the crosshead and converging downwardly and outwardly therefrom to pass through said guide, a clamp slidably mounted and adjustably positioned on said boom to engage said flexible member, and a tension spring interconnecting said clamp and a point on said boom to yieldably resist movement of said clamp relative to said guide.

7. In a spray boom structure, an upright support member, a spray boom mounted thereon for pivotal movement about horizontal and vertical axes, a boom supporting cable, means affixing the ends thereof to said support member at points above and spaced laterally from the adjacent portion of said boom, and a clamp on a remote portion of said boom to releasably engage said cable intermediate its ends.

8. In a spray boom structure, a vertical support member, a spray boom mounted on said support member for pivotal movement about vertical and horizontal axes, means suspending an outer portion of said boom from said support member, including a cable attached to said support member at points above and spaced laterally from the adjacent portion of said boom, and a clamp on said boom to engage said cable intermediate its ends to provide vertical and horizontal adjustment of said boom.

9. In a spray boom structure, a vertical support member, a spray boom mounted thereon for pivotal movement about vertical and horizontal axes, means suspending said boom from said support member to normally restrain pivotal movement of said boom, said means comprising a cable affixed to said support member at points above and laterally spaced from the adjacent portion of said boom, a clamp releasably engaging the outer portion of said boom, and means on said clamp to releasably engage said cable intermediate its ends to provide vertical and horizontal adjustment of said boom.

10. In a spray boom structure, a vertical support member, a spray boom mounted thereon for pivotal movement about horizontal and vertical axes, means suspending said boom from said support member, said means comprising a cable affixed to said support member at points above and laterally spaced from the adjacent portion of said boom, a slidably adjustable clamp mounted on a remote portion of said boom to releasably engage said cable intermediate its ends, a collar secured to an outer portion of said boom, and a resilient element under tension connecting said collar and cable clamp.

11. In a spray boom structure, a vertical support member, a spray boom mounted thereon for pivotal movement about horizontal and vertical axes, pulleys on said support member at points above and spaced laterally from the adjacent portion of said boom, a cable trained over said pulleys and secured to a remote portion of said boom, and means to clamp said cable to said support member to normally restrain pivotal movement of said boom.

12. In a spraying unit, a support frame, a boom mounted for free universal movement on said frame, an adjustable clamp mounted on the boom, guys adjustably connected to said clamp, means on said clamp to provide slidable movement thereof in a direction axially of said boom for adjusting said guys, and means connecting said guys to said frame above and on opposite sides of the universal mounting of the boom on the frame to support said boom in a predetermined position and for guided movement vertically and laterally from said position.

13. In a spray boom structure, a support frame, a boom mounted on said support frame, a cable interconnecting said boom and said support frame for supporting said boom from said frame, a clamp mounted on said boom and in engagement with said cable for holding said cable in a predetermined position, said clamp comprising superposed circular plates having confronting peripheral edges beveled to form a groove for receiving said cable, and means pressing said plates together for securing said cable within said clamp.

14. In a spray boom structure, a support frame, a boom mounted on said support frame, a cable interconnecting said boom and said support frame for supporting said boom from said frame, a clamp mounted on said boom and in engagement with said cable for holding said cable in a predetermined position, said clamp comprising superposed plates having opposing recesses forming a groove for receiving said cable, and means pressing said plates together for securing said cable within said clamp.

15. In a spray boom structure, an upright support member, a spray boom mounted thereon for pivotal movement about horizontal and vertical axes, a boom supporting cable, means affixing the ends thereof to said support member at points above and spaced laterally from the adjacent portion of said boom, a clamp on a remote portion of said boom releasably engaging said cable intermediate its ends, and a resilient element under tension interconnecting said clamp and said boom.

16. In a spray boom structure, an upright support member, a spray boom mounted thereon for pivotal movement about horizontal and vertical axes, a boom supporting cable, means adjustably affixing the ends of said cable to said support member at points above and spaced laterally from the adjacent portion of said boom, and a clamp on a remote portion of said boom releasably engaging said cable intermediate its ends.

References Cited in the file of this patent

UNITED STATES PATENTS

| | | |
|---|---|---|
| 350,704 | Stretch | Oct. 12, 1886 |
| 1,634,701 | Williams | July 5, 1927 |
| 2,210,346 | Stayton | Aug. 6, 1940 |
| 2,221,433 | Pitner | Nov. 12, 1940 |
| 2,259,966 | Tappe | Oct. 21, 1941 |
| 2,619,379 | Skifte | Nov. 25, 1952 |
| 2,657,093 | Kucera | Oct. 27, 1953 |